US011095956B2

(12) United States Patent
Mihajlovic et al.

(10) Patent No.: US 11,095,956 B2
(45) Date of Patent: Aug. 17, 2021

(54) METHOD AND SYSTEM FOR DELIVERING AN INTERACTIVE VIDEO

(71) Applicant: FLAVOURWORKS LTD, West Sussex (GB)

(72) Inventors: Pavle Mihajlovic, London (GB); Jack Attridge, West Sussex (GB)

(73) Assignee: FLAVOURWORKS LTD, West Sussex (GB)

( * ) Notice: Subject to any disclaimer, the term of this patent is extended or adjusted under 35 U.S.C. 154(b) by 0 days.

(21) Appl. No.: 16/311,978

(22) PCT Filed: Jun. 20, 2017

(86) PCT No.: PCT/GB2017/051799
§ 371 (c)(1),
(2) Date: Dec. 20, 2018

(87) PCT Pub. No.: WO2017/220993
PCT Pub. Date: Dec. 28, 2017

(65) Prior Publication Data
US 2019/0215581 A1 Jul. 11, 2019

(30) Foreign Application Priority Data

Jun. 20, 2016 (GB) ...................................... 1610755

(51) Int. Cl.
*H04N 21/8545* (2011.01)
*H04N 21/431* (2011.01)
(Continued)

(52) U.S. Cl.
CPC ..... *H04N 21/8545* (2013.01); *G06F 3/04842* (2013.01); *G06F 3/04845* (2013.01);
(Continued)

(58) Field of Classification Search
CPC ........... H04N 21/8545; H04N 21/4318; H04N 21/4728; G06F 3/04842; G06F 3/04845; G06T 11/60
(Continued)

(56) References Cited

U.S. PATENT DOCUMENTS 8,069,466 B2 * 11/2011 Shelton ................... H04N 5/445
725/134
8,751,933 B2 * 6/2014 Perrodin ................ G11B 27/34
715/716
(Continued)

FOREIGN PATENT DOCUMENTS

EP 1 128 328 8/2001

OTHER PUBLICATIONS

International Search Report for PCT/GB2017/051799 dated Aug. 4, 2017, 3 pages.

*Primary Examiner* — William D Titcomb
(74) *Attorney, Agent, or Firm* — Nixon & Vanderhye, P.C.

(57) ABSTRACT

The present invention relates to methods, systems, computer programs, and electronically readable media for creating and delivering interactive videos. A first visual element is delivered in a first display area. A first user input is received over a first user-selected portion of the first display area. A second visual element is delivered over at least the first user-selected portion of the first display area. At least one of the first visual element or the second visual element includes video.

15 Claims, 9 Drawing Sheets

(51) Int. Cl.
*H04N 21/4728* (2011.01)
*G06F 3/0484* (2013.01)
*G06T 11/60* (2006.01)

(52) U.S. Cl.
CPC ......... *G06T 11/60* (2013.01); *H04N 21/4318* (2013.01); *H04N 21/4728* (2013.01)

(58) Field of Classification Search
USPC ........................................................ 715/719
See application file for complete search history.

(56) References Cited

U.S. PATENT DOCUMENTS

| | | | |
|---|---|---|---|
| 8,832,555 B2* | 9/2014 | Weber | G11B 27/034 |
| | | | 715/719 |
| 2005/0075166 A1 | 4/2005 | Hemstreet et al. | |
| 2010/0169783 A1* | 7/2010 | Weber | G06F 17/212 |
| | | | 715/731 |
| 2014/0019865 A1* | 1/2014 | Shah | H04N 21/8541 |
| | | | 715/731 |
| 2014/0087877 A1 | 3/2014 | Krishnan | |
| 2014/0228120 A1 | 8/2014 | Hong et al. | |
| 2015/0033127 A1* | 1/2015 | Abbas | G11B 27/034 |
| | | | 715/719 |
| 2015/0220249 A1* | 8/2015 | Snibbe | G06F 3/0412 |
| | | | 715/719 |
| 2015/0356715 A1* | 12/2015 | Nakata | G06F 1/1624 |
| | | | 715/719 |
| 2019/0208288 A1* | 7/2019 | Mihajlovic | H04N 21/47202 |
| 2019/0215571 A1* | 7/2019 | Mihajlovic | H04N 21/4725 |

* cited by examiner

METHOD AND SYSTEM FOR DELIVERING AN INTERACTIVE VIDEO

This application is the U.S. national phase of International Application No. PCT/GB2017/051799 filed Jun. 20, 2017 which designated the U.S. and claims priority to GB 1610755.9 filed Jun. 20, 2016, the entire contents of each of which are hereby incorporated by reference.

FIELD

The present application is in the field of delivering video. More particularly, but not exclusively, the present application relates to interactive video.

BACKGROUND

Interactive video utilizes dynamic input to determine what video frames and/or video content is delivered. Interactive video can be used in entertainment, education, and gaming.

Previous methods of creating interactive content have used entirely computer-generated methods, including generating sprites, vectors, or 3d models, to produce video in response to real-time inputs. Computer-generated graphics can create precise event sequences in response to, for example, a user's input in a video game. Creating high-quality graphics that are realistic and engaging with computer-generated methods is processor-intensive, inefficient, and slow, however. For these reasons, the highest quality interactive computer-generated graphics typically can only be accessed with computers that include advanced graphics processing units, such as desktop computers.

Previously, users have not been able to access the highest quality interactive content using the lower performing hardware available on a smartphone or tablet computer, however, which offer more limited graphics processing units, and limited battery life.

In addition, creating high-quality interactive content including computer-generated graphics has entailed a tremendous cost and complexity for content creators. The expense and technical complexity required may bar those who would like to create high quality interactive video content from using computer-generated methods.

Rather than relying on computer-generated graphics rendered in real time to creating interactive content, it is possible to use at least some previously generated video files. By providing previously generated video clips, such as live action video, this may avoid the need to dynamically render processor-intensive graphics in response to user inputs. The pre-generated videos can also use real actors and props, which can make interactive content appear more realistic than those using computer-generated graphics.

Creating interactive content based on previously generated video clips requires the dynamic integration of multiple pre-recorded clips in response to real-time user inputs. Previous products, however, have not allowed a user to change the video content displayed in a user-selected area of a video display dynamically in response to real time inputs.

It is an object of the present invention to provide a method of generating interactive video that overcomes the disadvantages of the prior art, or at least provides a useful alternative.

SUMMARY OF INVENTION

According to a first aspect of the invention there is provided a method for delivering an interactive video, the method including:

delivering a first visual element in a first display area;

receiving a first user input over a first user-selected portion of the first display area; and delivering a second visual element over at least the first user-selected portion of the first display area, wherein at least one of the first visual element or the second visual element includes video.

According to a further aspect, the first visual element may include a first video clip and the second visual element includes a second video clip.

According to a further aspect, at least one of the first visual element or the second visual element may include one or more frames.

According to a further aspect, at least one of the first visual element or the second visual element may include live action video.

According to a further aspect, the first visual element may include a first live action video and the second visual element may include a second live action video.

According to a further aspect, at least one of the first visual element or the second visual element may be dynamically generated based on the video.

According to a further aspect, the at least one of the first visual element or the second visual element may be dynamically generated based on the first user input.

According to a further aspect, the at least one of the first visual element or the second visual element may be dynamically generated using a first shader to create a first shader effect.

According to a further aspect, the first shader effect may include at least one of: a fog effect, a dust effect, a smoke effect, a water droplet effect, an underwater view, a drawing effect, a covering effect, a watermark effect, or a wavelet effect.

According to a further aspect, a peripheral area of the user-defined portion the first visual element may be dynamically generated using a second shader to create a second shader effect.

According to a further aspect, the at least one of the first visual element or the second visual element may be dynamically generated based on the video for a predetermined time.

The method may further include the steps of:

delivering a third visual element in a second display area;

receiving a second user input over a second user-selected portion of the second display area; and delivering a fourth visual element over the second user-selected portion of the second display area.

According to a further aspect, at least one of the third visual element or the fourth visual element may include live action video.

According to a further aspect, the third visual element may be dynamically generated from the first visual element.

According to a further aspect, the fourth visual element may be dynamically generated from the second visual element.

According to a further aspect, at least one of the third visual element or the fourth visual element may be dynamically generated from at least one of the first visual element or the second visual element by a third shader to create a third shader effect.

The method may further include the steps of:

receiving a third user input over a third user-selected portion of the first display area; and delivering a fifth visual element over at least an overlap region between the third user-selected portion and the third user-selected portion of the first display area.

According to a further aspect, delivering the first visual element and the second visual element may include displaying the first visual element and the second visual element on a client device, and the first user input may be received at the user device.

According to a further aspect, at least one of the first visual element or the second visual element may be dynamically generated at the first device.

According to a further aspect, there may be a system for delivering an interactive video via any one of the methods of the first aspect.

According to a further aspect, there may be a computer program configured to perform via any one of the methods of the first aspect.

According to a further aspect, there may be an electronically readable medium storing a computer program operable to execute any one of the methods of the first aspect.

According to a second aspect, there is provided a method for creating an interactive video for delivery in accordance with the method of any one of the preceding claims, the method comprising:

providing instructions to deliver a first visual element in a first display area;

providing instructions to deliver a second visual element over at least the first user-selected portion of the first display area, wherein at least one of the first visual element or the second visual element includes video; and providing instructions to wait for a first user input, the first user input designating the first user-selected portion during delivery of the first visual element.

According to a further aspect, there may be a computer program configured to perform a method as claimed in any method of the second aspect.

According to a further aspect, there may be an electronically readable medium storing a computer program operable to execute any one of the methods of the second aspect.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method, system, and computer program to facilitate the creation and delivery of an interactive video.

Figure 1:
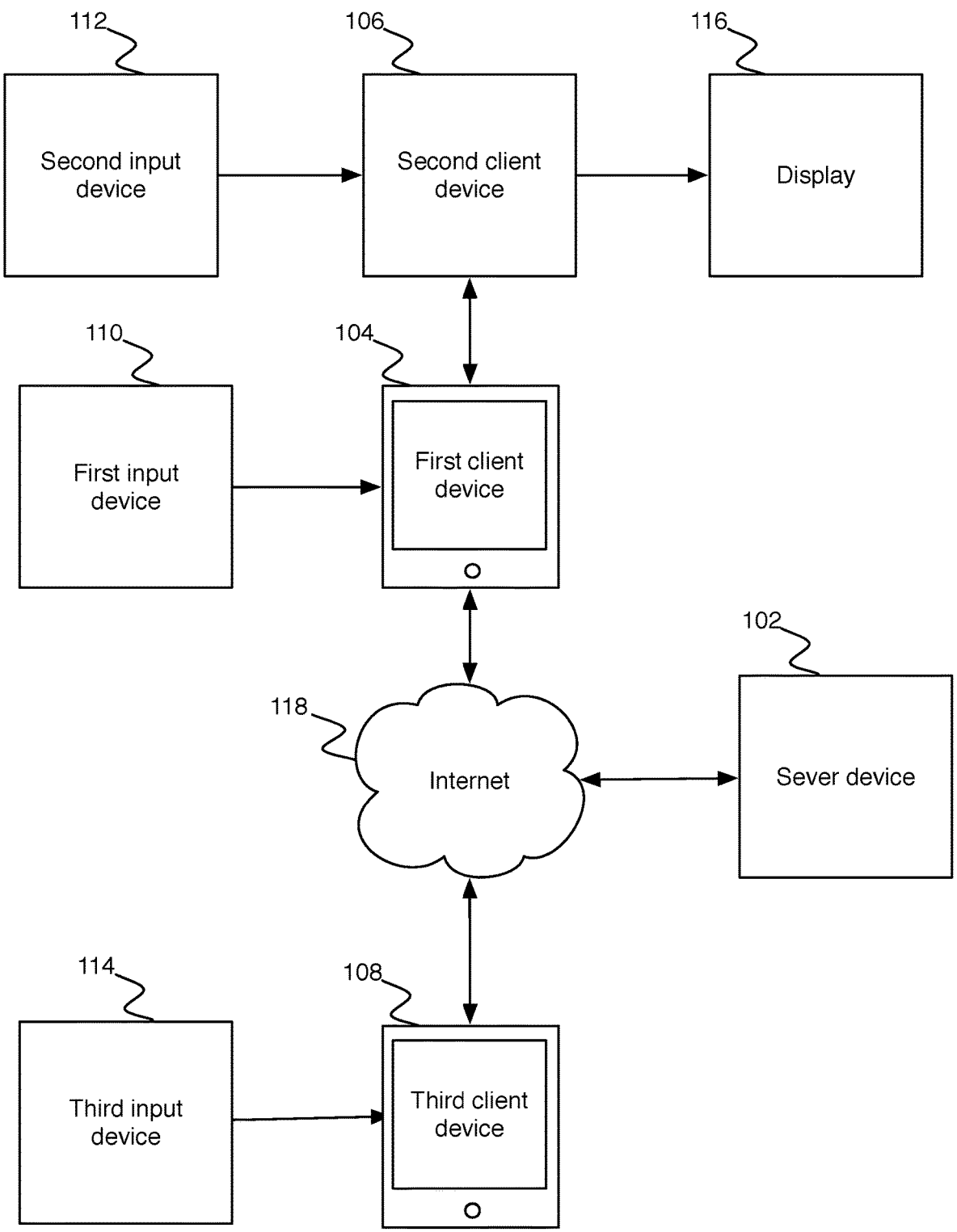
FIG. 1: depicts system 100, in accordance with an embodiment of the invention.

FIG. 1 depicts a system 100 in accordance with an embodiment. System 100 includes first client device 104. System 100 may further include server 102, second client device 106, third client device 108, first input device 110, second input device 112, third input device 114, display 116, and the Internet 118.

Server 102 may be operable to facilitate the delivery of an interactive video, as described in relation to FIGS. 4 to 10. First, second, and third client devices 104, 106, and 108 may further be operable to facilitate the delivery of the interactive video, as described in relation to FIGS. 4 to 10.

Figure 2:
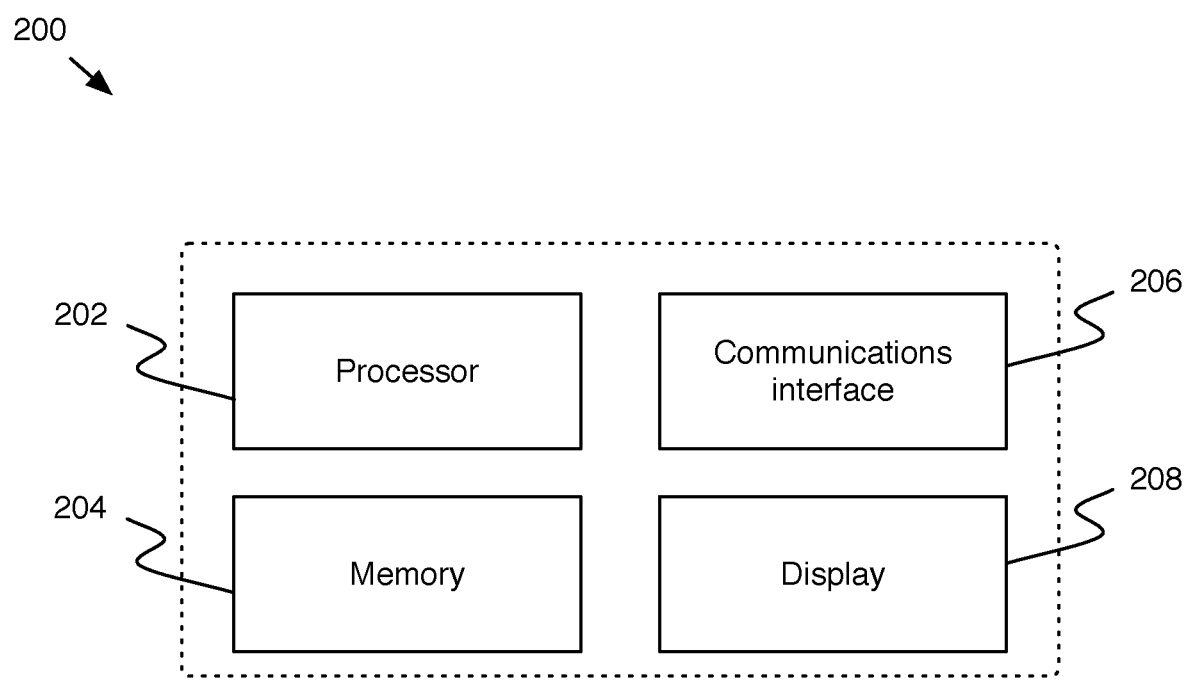
FIG. 2: depicts system 200, in accordance with an embodiment of the invention.

Each of server 102, first client device 104, second client device 106, and third client device 108, may include a processing device 200, as depicted in FIG. 2. Processing device 200 includes a processor 202, a memory 204, and a communication interface 206. In examples, processing device 200 may further include a display 208.

Processor 202 may be configured for executing computer instructions, which, when executed on the system 100, perform a portion or all of the methods described in relation to FIGS. 4 to 10. In embodiments, processor 202 may include a single, or any multiple number of processors, as will be understood by those of skill in the art.

Memory 204 may be an electronically readable medium or a computer readable medium configured to store computer program instructions. In examples, memory 204 may include a non-transitory medium.

Stored computer program instructions, when executed on the processor 202, may perform a portion or all of the methods described in relation to FIGS. 4 to 10.

In examples, processor 202 and memory 204 may be incorporated into a custom chipset, such as a system on a chip. For example, processor 202 and memory 204 may be incorporated into a custom Snapdragon, Tegra, Mali-400, Cortex, Samsung Exynos, Intel Atom, Apple, or Motorola chip, or any other type of chip known to those of skill in the art.

In examples, portions of the methods described in relation to FIGS. 4 to 10 may be stored or executed outside of system 100. For example, a portion of the methods described in relation to FIGS. 4 to 10 may be stored or executed on a combination of a server and cloud storage facility via Internet 118.

Communications interface 206 may be configured to communicate with devices external to server 102, first client device 104, second client device 106, or third client device 108. For example, communications interface 206 may communicate with any of first input device 110, second input device 112, third input device 114, or display 116.

In examples, communications interface 206 may be wired or wireless interfaces. Communications interface 206 may include a short-range or low-powered wireless standard such as Bluetooth, Bluetooth LE, zigbee, or near field communication (NFC). Communications interface 206 may further include WIFI, 3G, 4G, Ethernet, or any other communications known to those of skill in the art. In examples, processing device 200 may request, send, or receive information, save information, or send or receive messages from a remote device over Internet 118.

When the processing device 200 includes an integrated display 208, the display 208 may be operable to display one or more interactive videos in conjunction with the methods described in relation to FIGS. 4 to 10.

In examples, any of first client device 104, second client device 106, or third client device 108 may be a hand-held or mobile computing device such as a smart phone, a tablet, a smart watch, or a wearable device. In further examples, any of first client device 104, first client device 106, or second client device 108 may be a computing apparatus such as a smart TV, a video game console, a laptop, or desktop computer, or an app-enabled piece of household hardware.

In examples, first client device 104, second client device 106, or third client device 108 may receive inputs from one or more inputs from integrated input devices. In further examples, however, first client device 104, second client device 106, or third client device 108 may be connected to any combination external input devices, such as: first input device 110, second input device 112, or third input device 114, respectively.

First client device 104, second client device 106, third client device 108, first input device 110, second input device 112, or third input device 114 may include any combination of input devices operable to receive information from a human, an animal, or an environment. For example: first, second or third client device 104, 106, 108, or first, second, or third input device 110, 112, 114 may include: a touch screen, a mouse, a game controller, a gesture recognition device, a joystick, a pressure sensing device, an accelerometer, a gyroscope, or a GPS.

In further examples, first, second or third client device 104, 106, 108, or first, second, or third input device 110, 112, 114 may include one or more biomonitor devices, such as a heart rate monitor, an oximeter, or an electromyography monitor. Alternatively, first, second or third client device 104, 106, 108, or first, second, or third input device 110, 112, 114 may include any combination of environmental sensors, such one or more weather or motion sensors. First, second or third client device 104, 106, 108, or first, second, or third input device 110, 112, 114 may further include any other type of input device known of those of skill in the art.

FIG. 1 includes a server device 102. Server device 102 may be operable to execute instructions, or to retrieve and save data in a database. In examples, server device 102 may include a single server, or multiple servers in a distributed architecture. In examples, server device 102 may support a relational database, a NoSQL database, a distributed database, or any other database known to those of skill.

In examples, server 102 may communicate via Internet 118 to deliver interactive video to at least one of first client device 104 or third client device 108.

In further examples, however, first client device 104 may communicate with second client device 106 to deliver interactive video on at least one of first client device or second client device. In examples, second client device 106 may display video on external display 116.

Figure 3:
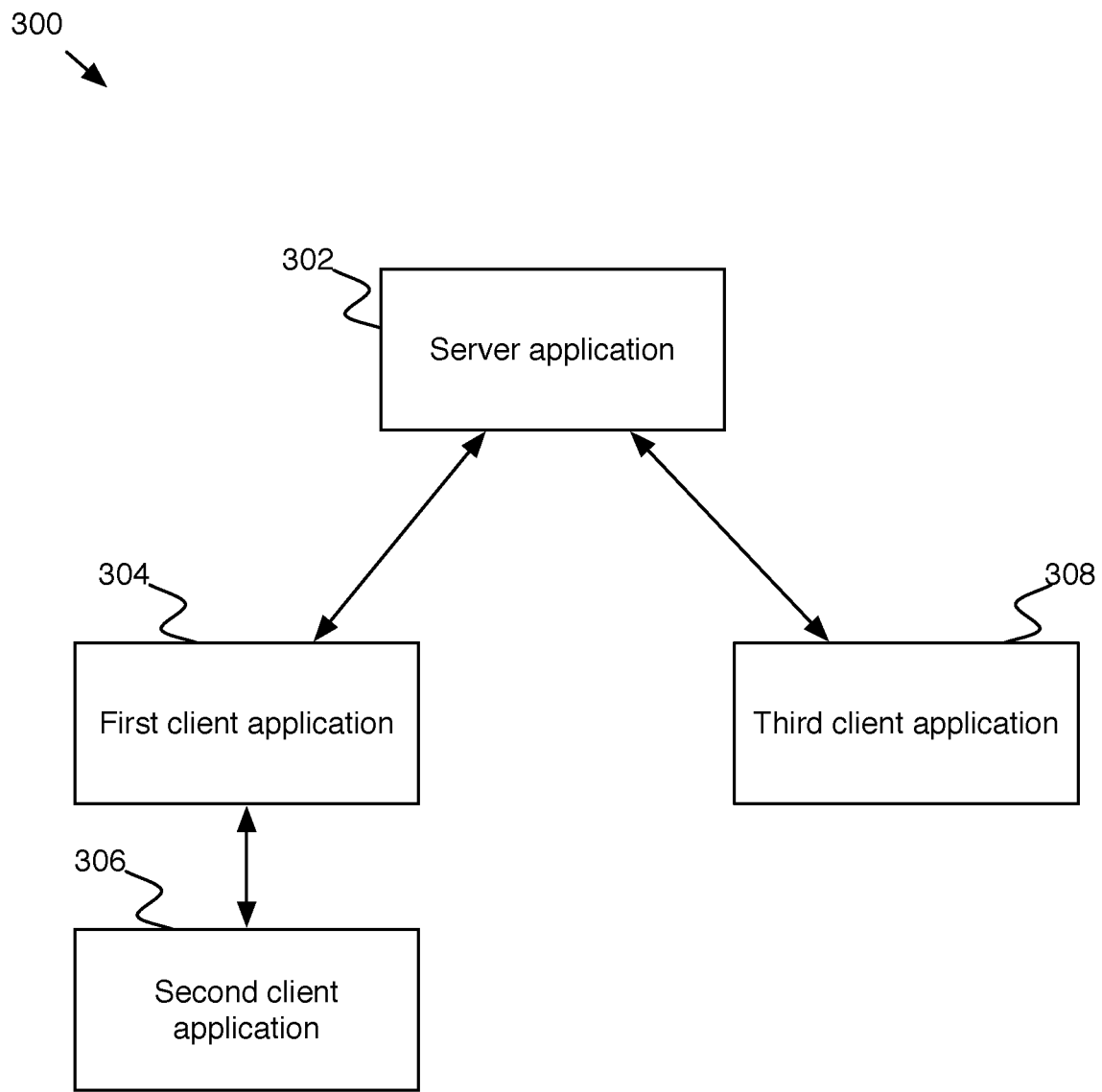
FIG. 3: depicts system 300, in accordance with an embodiment of the invention.

FIG. 3 depicts system 300, in accordance with an embodiment. System 300 may facilitate the delivery of an interactive video. System 300 includes first client application 304. System 300 may further include server application 302, second client application 306, and third client application 308.

Server application 302 may be configured to receive input from at least one of first client application 304, second client application 306, and third client application 308, and to deliver interactive video.

First client application 304, second client application 306, and third client application 308 may further be configured to receive input and deliver an interactive video.

First and third client applications 304, and 308 may each communicate with server application 302.

Second client application 306 may communicate with first client application 304. Second client application 306 may receive inputs from or transmit inputs to first client application 304. In examples, second client application 306 may display an interactive video after receiving inputs from first client application 304.

In examples, server application 302, first client application 304, second client application 306, and third client application 308 may each operate on separate devices. For example, server application 302 may operate on server device 102; first client application 304 may operate on first client device 104; second client application 306 may operate on second client device 106; and third client application 308 may operate on third client device 108.

In further examples, however, the functions of any one of server application 302, first client application 304, second client application 306, and third client application 308 may be distributed across additional computing devices. For example, server application 302 may operate across a group of distributed servers.

Figure 4:
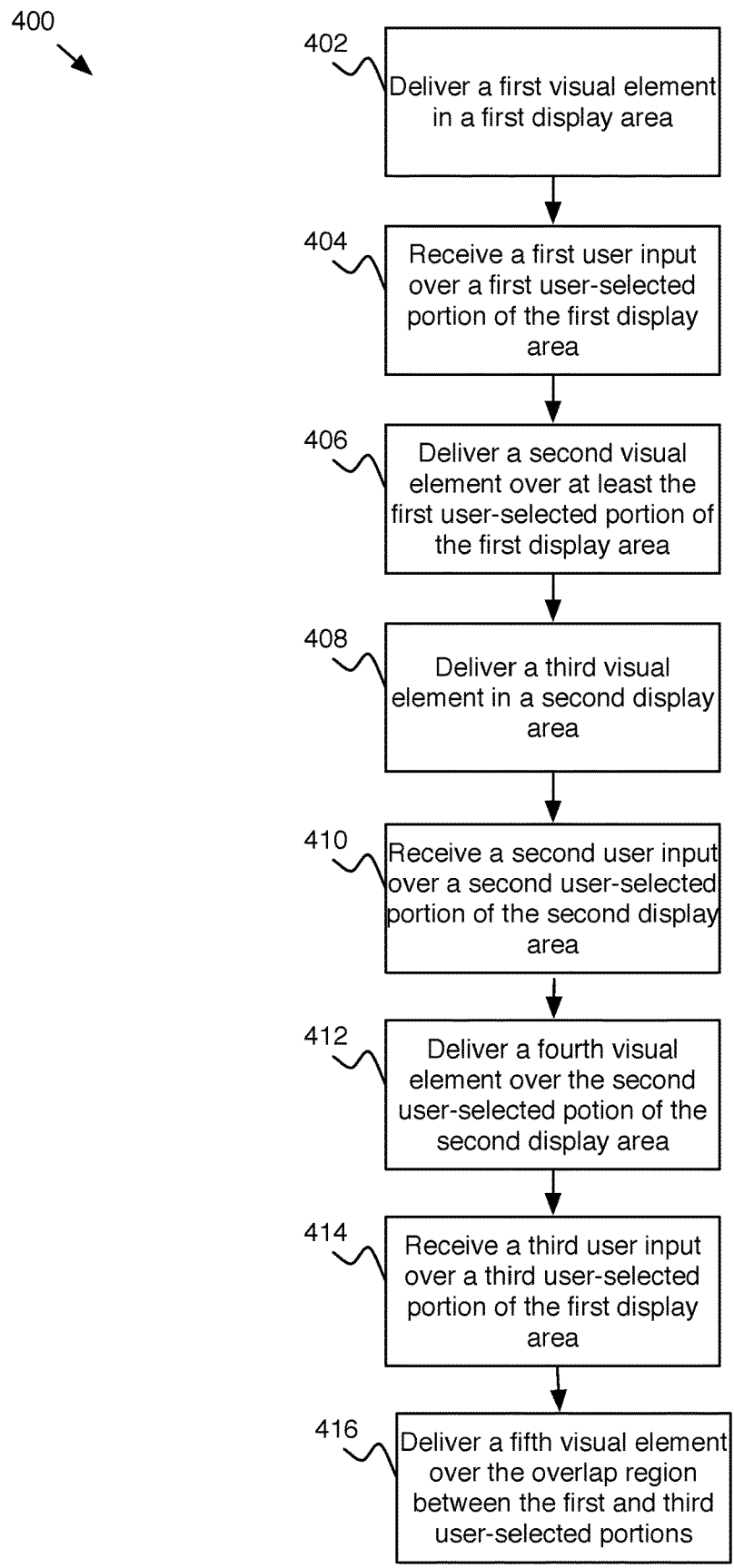
FIG. 4: depicts method 400, in accordance with an embodiment of the invention.

FIG. 4 depicts method 400, an example embodiment that may execute within server application 302, first client application 304, second client application 306, or third client application 308. Method 400 may deliver an interactive video. An interactive video may deliver one or more frames based on a video file in response to one or more inputs.

Figure 5:
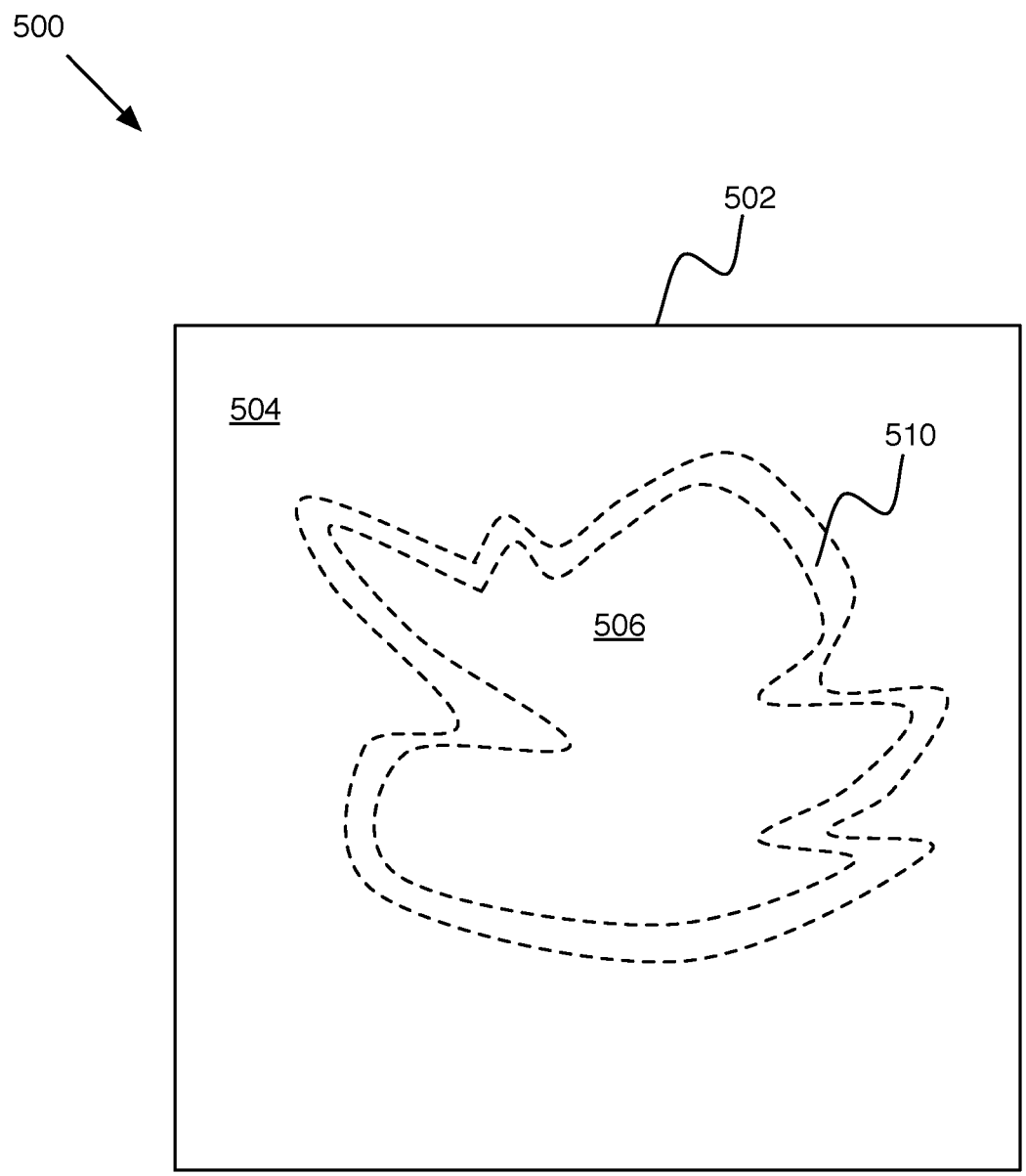
FIG. 5: depicts interactive video 500, in accordance with an embodiment of the invention.

For example, FIG. 5 depicts example interactive video 500. As may be seen in FIG. 5, interactive video 500, including a first display area 504 and a first user-selected display portion 506.

Method 400 begins with step 402. In step 402, a first visual element is delivered in the first display area 504. In the example of interactive video 500, the first display area covers the entire interactive video display area 502.

A visual element may include one or more frames or images. In examples, a visual element may be a video clip. In further examples, however, a visual element may include a static image.

Method 400 continues with step 404. In step 404, a first user input is received over a first user-selected portion of the first display area.

The first input may be provided by a user via any of the input devices discussed with reference to first client device 104, second client device 106, third client device 108, first input device 110, second input device, 112, or third input device 114 above.

The first user-selected portion of the first display area may include any one or more regions selected by a user. For example, interactive video 500 depicts a single, irregular first user-selected portion 506 within the first display area 504.

In examples, a user may provide input by touching an area of a touch screen, or drawing over interactive video 500 with a mouse to select user-selected portion 506.

The first user-selected portion 506 may be any shape or size. Although the example of FIG. 5 depicts the first user-selected portion 506 as being a single, continuous area, this is not intended to be limiting. In examples, first user-selected portion 506 may include multiple, or separate areas within first display area 504. For example, the user may touch a first part of first display area 504 and then a second, non-adjacent area of first display area 504.

Method 400 continues with step 406. In step 406, a second visual element is delivered over at least the first user-selected portion of the first display area. At least one of the first visual element or the second visual element includes video. In examples, the video may depict sequences of movements or events that a user may interact with or change.

In examples, the first visual element may include a first video clip and the second visual element may include a second video clip.

In examples, at least one of the first visual element or the second visual element may include one or more frames. This may allow the first visual element or the second visual element to depict a dynamic sequence of movements, events, or changes to a scene.

In examples, at least one of the first visual element or the second visual element may include live action video. Live action video includes video filmed with a camera using real actors and/or objects.

In examples, live action video may include no computer-generated graphics.

In further examples, the live action video may incorporate some previously generated, or dynamically generated computer-generated graphics.

In examples, the first visual element may include a first live action video and the second visual element may include a second live action video.

For example, the first live action video may include live action as filmed through a window covered with fog, and the second live action video may include the live action as filmed through a window not covered with fog. By delivering the second visual element of the fogless window in the user-selected portion 506, it may be possible to provide the experience to the user of wiping the fog off a window to watch the live action. In examples, inherent features of the live-action video, for example, visible film graininess, may provide a natural and realistic user experience over a computer-generated graphics video.

In a further example, the first live action video may include an actor crying, and the second live action video may include the same actor with dry cheeks. By wiping the actor's face via the first input, the user may simulate wiping the tears of the actor away.

In examples, at least one of the first visual element or the second visual element may be dynamically generated based on the video. A dynamically generated visual element based on video may include adding computer-generated graphics to a previously created video at runtime, or when the first input is received. Dynamically generated graphics may include any computer generated graphics known to those of skill.

In examples, at least one of the first visual element or the second visual element may be dynamically generated based on the first user input. For example, the first user input may include an indication that a selection to dynamically draw on a window has been made.

In examples, the at least one of the first visual element or the second visual element may be dynamically generated using a first shader to create a first shader effect. A shader is a computer program that produces special effects, applies colour adjustments, or performs video post-processing. A visual element that is dynamically generated using a shader to create a shader effect is the result of applying the shader to a previously created version of a video clip.

In examples, a live action video that incorporates a shader effect may layer an additional special effect to a live action scene.

In examples, the first visual element and the second visual element may incorporate the same live action video, and at least one of the first visual element or the second visual element may incorporate the first shader effect. By providing the first shader effect in one of the first visual element or the second visual element, both of which include the same live action video, this may, provide the experience to a user of adding or removing the shader effect to the user-defined portion 506 of the first display area 502.

For example, if the first visual element includes the live action video with a dust shader effect incorporated, and the second visual element includes the live action video without the dust shader effect, the user may have the experience of wiping dust away from the user-selected portion 506 of the first video display 502.

In examples, the first shader effect may include at least one of: a fog effect, a dust effect, a smoke effect, or a water droplet effect. Any of the fog, dust, smoke, or water droplet effects may be added or removed in the user-defined portion 506 of first display area 502.

In examples, the first shader may further include an underwater view effect. The underwater view effect may simulate a view of events seen from above while looking down through the surface of water in the first display area 504.

In examples, the first shader effect may further include a drawing effect. The drawing effect may simulate, for example, writing on a window with lipstick.

In examples, the first shader effect may include a covering effect. The covering effect may simulate, for example, covering over a wall with paper.

In examples, the first shader effect may include a watermark effect. The watermark may provide a faint design over the first visual element.

In examples, the first shader effect may include a wavelet effect. The wavelet effect may make the appearance of waves on the surface of water within the user-defined portion 506 of the first display area 502, the wavelets being initiated by the user's input.

The examples of shader effects provided are not intended to be limiting. This application contemplates further shader effects, as will be understood by those of skill in the art.

The first shader effect may, for example, provide a fog effect over a live action video. If the second visual element includes a live-action video, and the first visual element includes the live-action action video with a fog shader effect applied, then when a user selecting a user-selected portion 506 may have the experience of wiping away fog from a window.

In examples, dynamically generating a visual element by applying a shader to a video may provide for more efficient, high-quality interactive video, because the shader requires fewer graphics processing unit resources to execute than creating a realistic visual element using 100% computer-generated graphics.

It may therefore be possible to create an interactive video that can run on a less-capable devices, such as smart phones.

In examples, a peripheral area of the user-defined portion the first visual element may be dynamically generated using a second shader to create a second shader effect. For example, FIG. 5 depicts peripheral area 510, which is positioned outside user-defined portion 506 of first display area 502, denoted in the figure as the region between the two sets of dotted lines. The peripheral area 510 may be any shape or form around the user-derived portion 506 of the first display area 502 as will be understood by those of skill.

In examples, the second shader effect may include the first shader effect applied with a different intensity. This may, for example, allow the first shader effect applied to the first visual element to transition into the second visual element, where the shader effect is not applied. For example, if a dust shader effect is incorporated into the first visual element playing in the first display area 504, and in the user-defined portion 506 there is no appearance of dust, the peripheral area 510 may incorporate a second shader effect providing a region with the appearance of a reduced amount of dust.

In a further example, the first shader effect may include a wavelet effect, and peripheral area 510 may include a diminished wavelet effect. This may allow the wavelet effect to appear to fade outside of peripheral area 510.

In further examples, the first shader effect may include an underwater view. A user may have the sensation of parting the under water by swabbing the user-defined portion 506 of the first display area 504. Peripheral area 510 may include a second shader effect that makes the appearance of a wall of water around the user-defined portion 506, thereby transitioning between the surface of the water in first display area 502 and the surface inside user-defined portion 506 where the water has been parted away.

Other examples of a second shader effect incorporated inside peripheral area 510 are also possible, as will be understood by those of skill in the art.

In examples, at least one of the first visual element or the second visual element may be dynamically generated based on the video for a predetermined time. In examples, the predetermined time may be selected before the user input is received, or determined by one or more user inputs. After the predetermined time, the first shader effect may disappear, providing the events of the underlying video without the provided effect.

For example, the first shader effect may provide a watermark effect over the second visual element in the user-defined portion 506 of the first display area 504. After the predetermined amount of time, the watermark effect may disappear, so that the watermark effect has a temporary duration.

In examples, method 400 may include further steps. For example, method 400 may include steps 408, 410, and 412.

Figure 6:
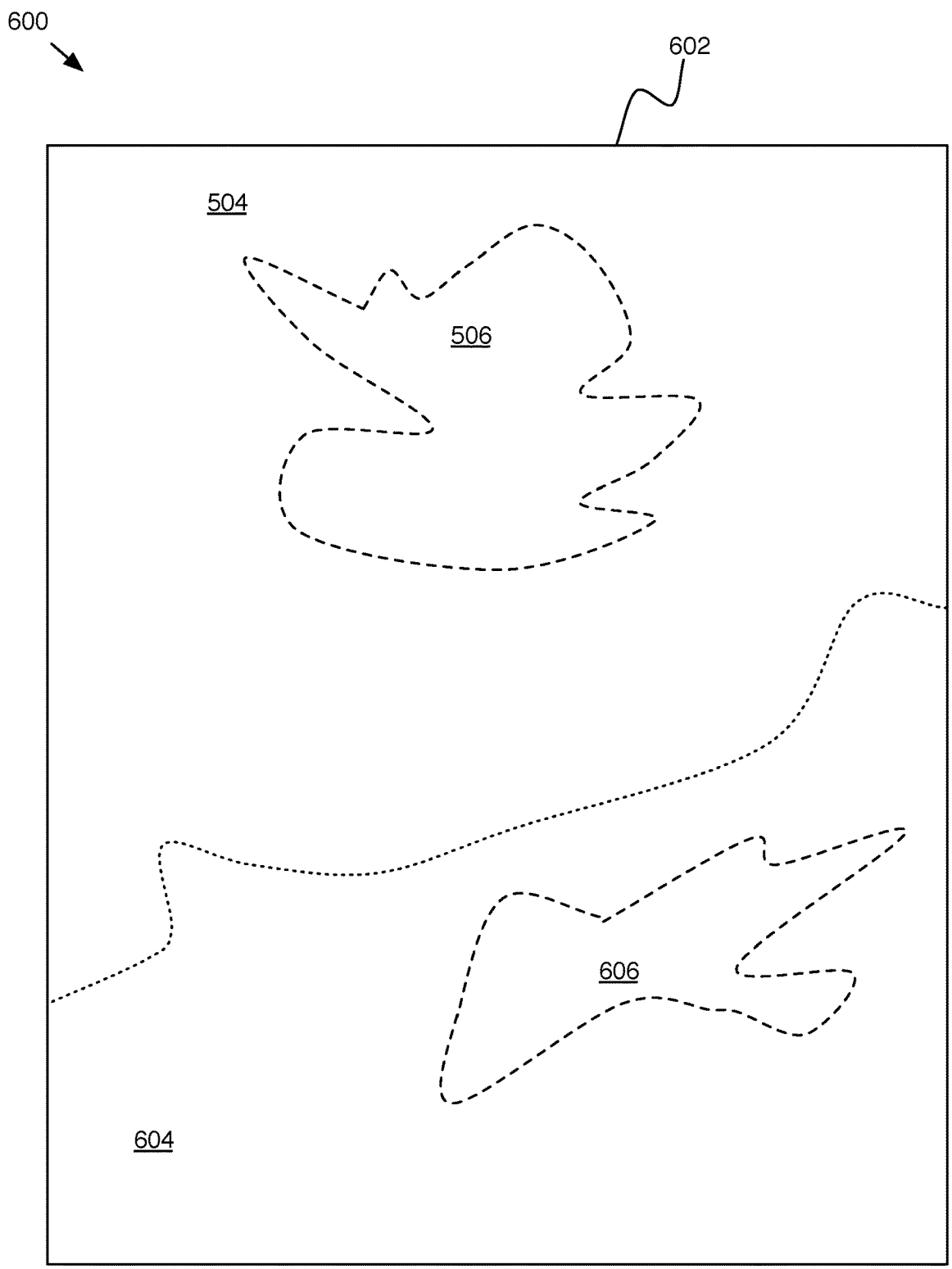
FIG. 6: depicts interactive video 600, in accordance with an embodiment of the invention.

In step 408, a third video clip may be delivered in a second display area. For example, FIG. 6 depicts interactive video 600 inside interactive display area 602. Interactive display area 602 includes first display area 504 and second display area 604. Third video clip may be delivered inside second display area 604.

In step 410, a second user input may be received over a second user-selected portion of the second display area. For example, interactive video 600 includes second user-selected portion 606 of the second display area 604.

In step 412, a fourth visual element may be delivered over the second user-selected portion of the second display area. For example, the fourth visual element may be delivered over user-selected portion 606 of second display area 604.

Steps 408, 410, and 412 may allow interactive video developers to create high-quality, realistic interactive video with multiple points of interaction for the user to engage.

In examples, at least one of the third video clip or the fourth visual element may include live action video.

In examples, the third video clip may be dynamically generated from the first visual element. For example, the third video clip may be the same as the first visual element, or it may be created from the same live action video. This may allow the user to "uncover" different events or scenes below a continuous video layer including first and second display areas 504 and 604 obscuring them.

In examples, the fourth visual element may dynamically generated from the second visual element. For example, the second visual element may be the same as the fourth visual element, or it may be created from the same live action video. This may allow a user to "uncover" portions of the same events or scenes below the first and second display areas 504 and 604.

In examples, at least one of the third video clip or the fourth visual element may be dynamically generated from at least one of the first visual element or the second visual element. In examples, at least one of the third video clip or the fourth visual element may incorporate a third shader effect.

In examples, method 400 may further include steps 414 and 416. In step 414, a third user input may be received over a third user-selected portion of the first display area.

Figure 7:
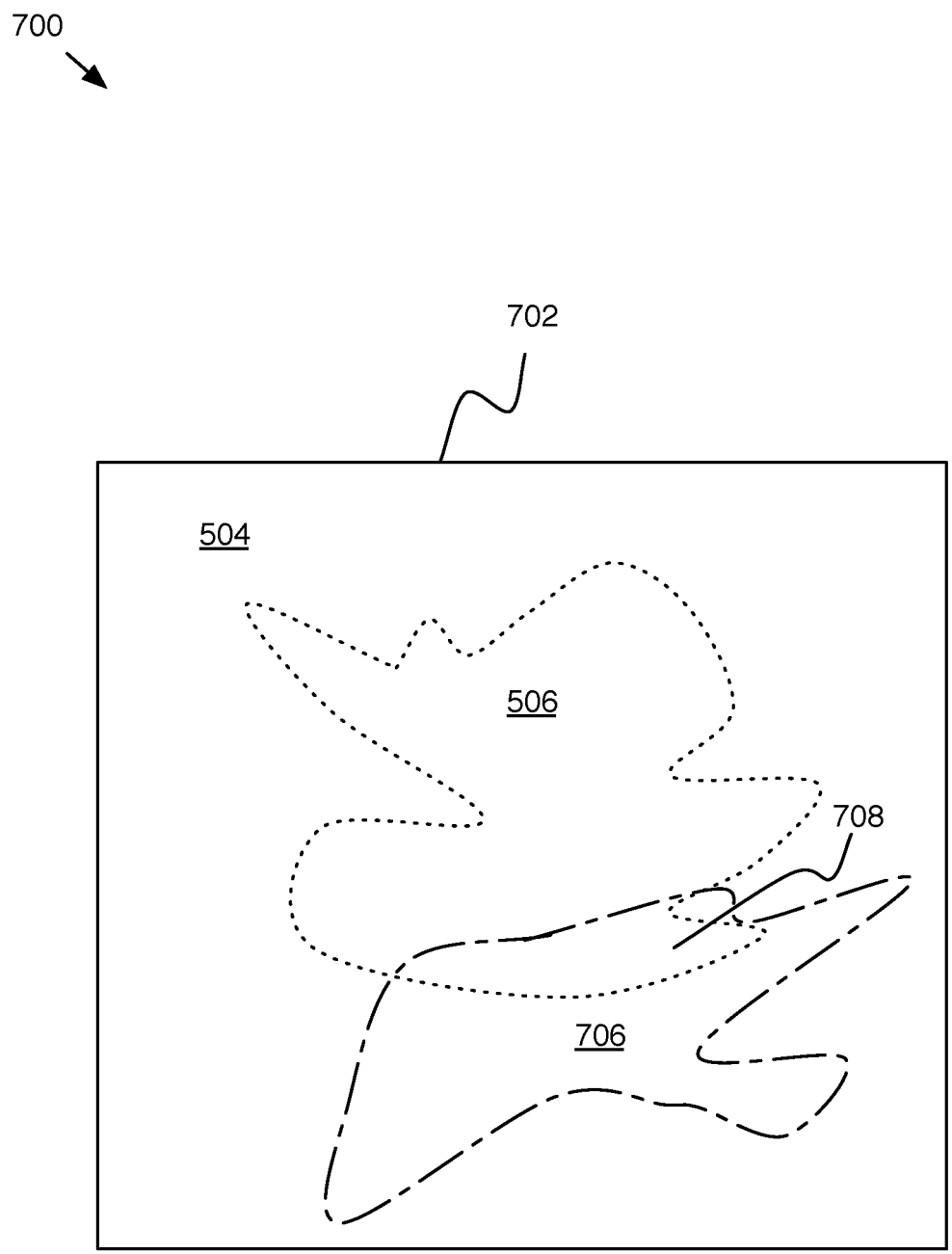
FIG. 7: depicts interactive video 700, in accordance with an embodiment of the invention.

For example, FIG. 7 depicts interactive video 700, including interactive video display 702. Interactive video display 702 includes first display area 504, first user-selected portion 506, and third user-selected portion 706.

In the example of interactive video 700, first user-selected portion 506 and third user-selected portion 708 overlap in an overlap region 708. In step 416, a fifth visual element may be delivered over at least an overlap region between the first user-selected portion and the third user-selected portion of the first display area.

By providing a fifth visual element, it may, for example, be possible for the user to experience removing two layers from an interactive video. For example, the user may remove a first layer of a gift-wrapped present via the first input, and to subsequently remove a second layer of the gift-wrapped present with the third input in the overlap region 706.

In further examples, it may be possible to add or remove a video layer or a shader effect. For example, a user may apply paper to a wall with the first input, and remove the paper with the third input.

By providing an interactive first visual element that allows a user to select an area where a second visual element is played, it may be possible to interact with the video in a tactile way, providing a high quality, realistic, immersive experience for a user. Because the response to the inputs happen in real time, without the delays that can be associated with rendering computer-generated graphics, the user experience an engaging, fast-response interactive video.

Without the need to provide real-time processor-intensive computer-generated graphics, it may therefore be possible to bring a wealth of interactive videos to less advanced devices than those required for existing products, such as smart phones and tablets.

In examples, delivering the first visual element and the second visual element may include displaying the first visual element and the second visual element on a client device, and the first user input is received at the user device.

For example, the first visual element and the second visual element may be displayed using one or more of the displays associated with first client device 104, second client device 106, third client device 108, display 116, or display 208. First user input may be received via one or more of: first user device 104, second user device 106, third user device 108, first input device 110, second input device 112, and third input device 114.

Figure 8:
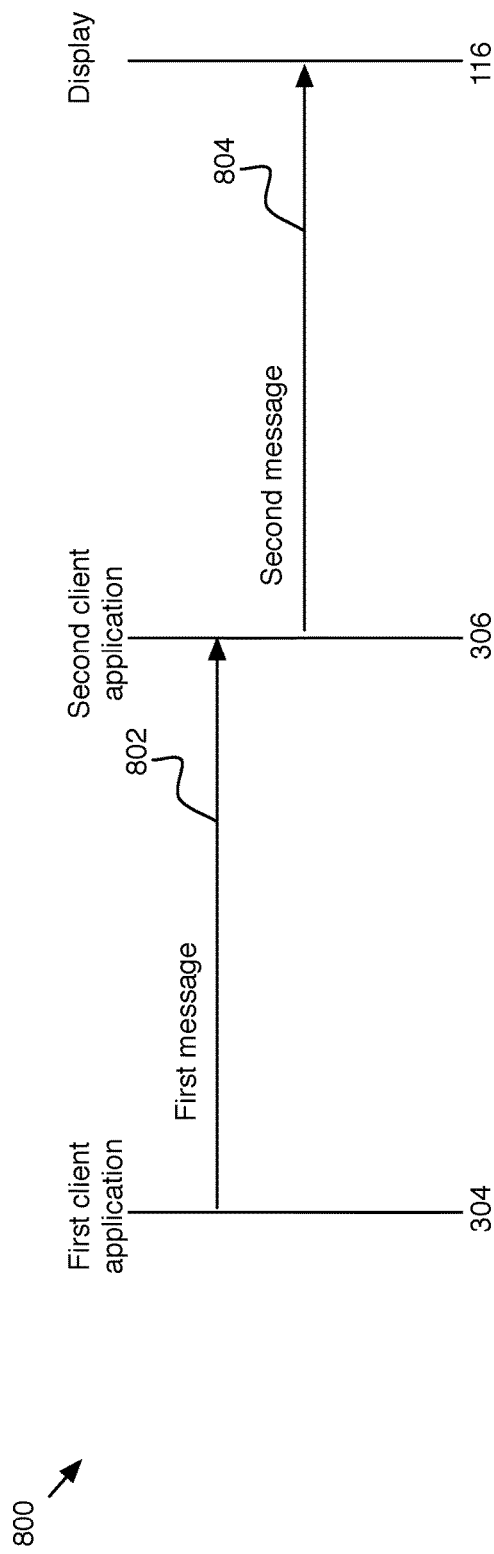
FIG. 8: depicts sequence diagram 800, in accordance with an embodiment of the invention.
Figure 9:
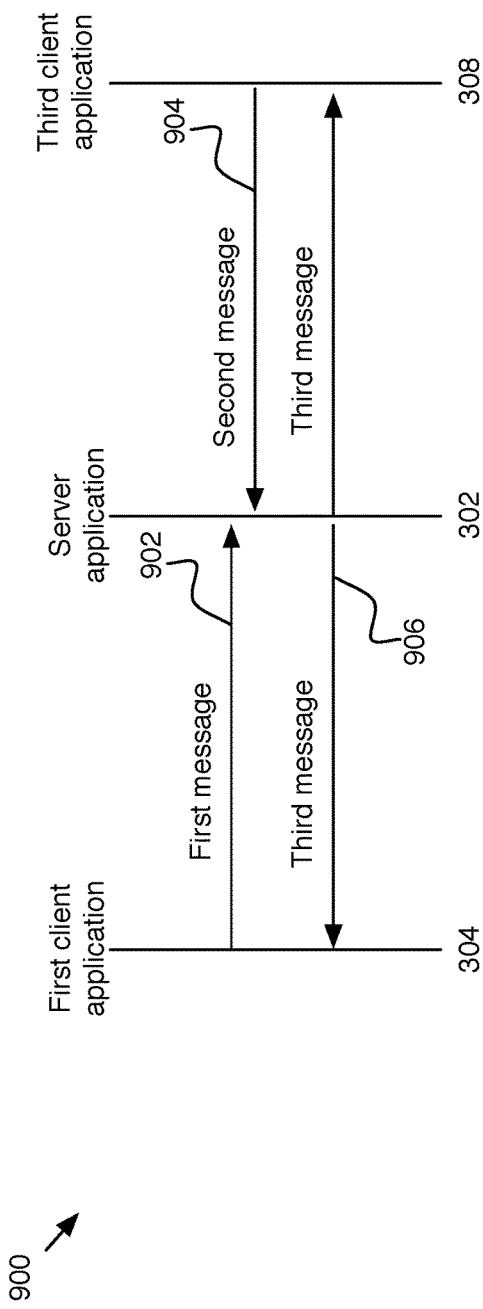
FIG. 9: depicts sequence diagram 900, in accordance with an embodiment of the invention.

Alternatively, the first visual element and the second may be displayed on an external display connected to a client device, such as display 116. For example, FIG. 8 depicts sequence diagram 800. As may be seen in sequence diagram 800, first client application 304 may send first message 802 to second client application 306. Second client application 306 may respond by sending second message 804 to display 116 in turn.

In examples, first message 802 may include input received at first client application 304. In further examples, first message 802 may include video clips or frames from video clips.

In examples, second message 804 may include instructions to display one or more video clips. In further examples, second message 804 may include actual video clips or frames to be displayed on first client application 304, in addition to areas where the video clips should be displayed.

The system depicted in sequence diagram 800 may allow a user providing inputs for an interactive video on first client device 104, for example a smart phone, to stream the interactive video to a second client device 106, for example a game controller, which can display the interactive video on a separate display 116, for example a television. This may allow one or more users to view the interactive video on a larger screen. It may also allow one or more additional users to interact with the interactive video.

The system depicted in sequence diagram 900 may allow a user to provide inputs to a client device that are sent to a server, and to receive interactive video from a server in turn based on the inputs.

For example, sequence diagram 900 depicts first client application 304 transmitting a first message 902 to server application 302. In examples, first message 902 may include user inputs. Server application 302 may transmit third message 906 back to first client application. In examples, the third message may include one or more video clips or one or more video frames in response to the input provided in the first message. For example, third message 906 may include the first visual element and the second visual element.

In examples, at least one of the first visual element or the second visual element may be dynamically generated at the first device. For example, the first visual element or the second visual element may be dynamically generated using a shader, as described above.

In examples, sequence diagram 900 may further include a third client application 308. As may be seen in FIG. 9, third client application 308 may further transmit a second message 904 to server application 302. Second message 904 may include further inputs from an additional user. In response, sever application 302 may transmit third message 906 to third client application 308 in addition to first client application 304. The system depicted in FIG. 9 may allow multiple users to interact with and display the same interactive video.

Figure 10:
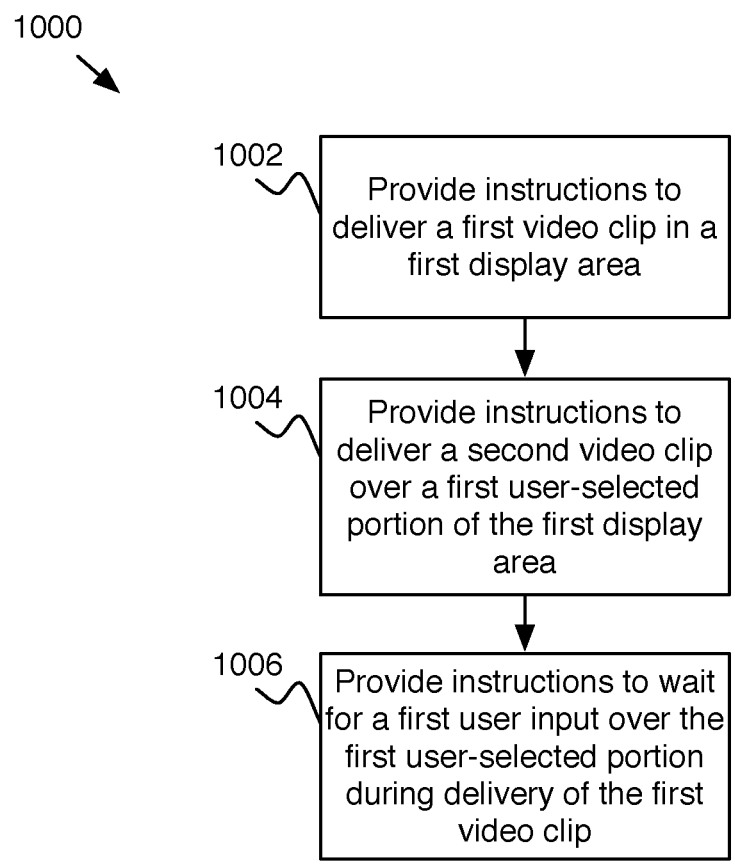
FIG. 10: depicts method 1000, in accordance with an embodiment of the invention.

FIG. 10 depicts method 1000, an example embodiment that may be used to generate an interactive video. Method 1000 begins with step 1002. In step 1002, instructions are provided to deliver a first visual element of the interactive video.

Providing instructions may include generating a script, source code, object code, or executable code to perform actions. In examples, the instructions may be created to run on a server device, a client device, or a combination thereof, as described above.

For example, step 1002 may provide the following example implementation of an interactive video. The example is provided in pseudo code, with comments noted by "//":

// load video in foreground of first display area
queuefg("firstVideoClip.mov")

Method 1000 continues with step 1004. In step 1004, instructions are provided to deliver a second visual element over at least the first user-selected portion of the first display area, wherein at least one of the first visual element or the second visual element includes video.

// load video in background of first display area
queuebg("secondVideoClip.mov")
// set game inputs to wipe from the foreground to the background enablewipingfgtobg( )

Method 1000 continues with step 1006. In step 1006, instructions to wait for a first user input are provided, the first user input designating the first user-selected portion during delivery of the first visual element.

For example, step 1006 may provide the following example implementation of an interactive video:

// Display both videos (initially the background video will be fully covered by
// the foreground) and we begin the interaction.
playqueuedfg( )
playqueuedbg( )

Because the methods may allow content creators make previously filmed content interactive, it may be possible to both reduce the cost of creating content and increase the realism the consumer perceives over prior products using method 1000.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for delivering an interactive video, the method comprising:
    delivering a first visual element in a first display area;
    during the delivery of the first visual element in the first display area, receiving a first user input over a first portion of the first display area to define a first user-defined portion of the first display area by a wiping user input; and
    delivering a second visual element within and over at least the first user-defined portion of the first display area during the wiping user input, wherein the second visual element replaces the first visual element within the first user-defined portion, the first visual element is a first live action video, and the second visual element is a second live action video.

2. The method according to claim 1, wherein the first visual element the second visual element include a plurality of frames.

3. The method according to claim 1, wherein at least one of the first visual element or the second visual element is dynamically generated based on adding computer-generated graphics to the first visual element or the second visual element.

4. The method according to claim 1, wherein the at least one of the first visual element or the second visual element is dynamically generated based on the first user input.

5. The method according to claim 1, wherein the at least one of the first visual element or the second visual element is dynamically generated using a first shader to create a first shader effect.

6. The method according to claim 5, wherein the first shader effect includes at least one of: a fog effect, a dust effect, a smoke effect, a water droplet effect, an underwater view, a drawing effect, a covering effect, a watermark effect, or a wavelet effect.

7. The method according to claim 5, wherein a peripheral area of the first user-defined portion of the first visual element is dynamically generated using a second shader to create a second shader effect.

8. The method according to claim 1, wherein the at least one of the first visual element or the second visual element is dynamically generated based on the first live action video or the second live action video for a predetermined time.

9. The method according to claim 1, wherein delivering the first visual element and the second visual element includes displaying the first visual element and the second visual element on a client device, and the first user input is received at the client device.

10. The method as claimed in claim 9, wherein at least one of the first visual element or the second visual element is dynamically generated at the client device.

11. A system for delivering an interactive video comprising:
a display;
a processor configured to:
deliver a first visual element in a first display area of the display,
during the delivery of the first visual element in the first display area, receive a first user input over a first portion of the first display area to define a first user-defined portion of the first display area by a wiping user input, and
deliver a second visual element within and over at least the first user-defined portion of the first display area during the wiping user input, wherein the second visual element replaces the first visual element within the first user-defined portion, the first visual element is a first live action video, and the second visual element is a second live action video; and
a memory configured to store the first and second visual elements.

12. The system of claim 11, wherein the first visual element includes a first face and replacing the first visual element within the first user-defined portion replaces a portion of the first face with a second face included in the second visual element.

13. The system of claim 11, wherein the first visual element includes a first object that is at least partially covered by a second object, and replacing the first visual element within the first user-defined portion with the second visual element replaces a portion of the first object covered by the second object to provide the second object without being covered by the second object.

14. The system of claim 11, wherein the second visual element removes a shader effect from the first visual element within the first user-defined portion.

15. The system of claim 11, wherein the second visual element replaces the first visual element by obscuring view of an object included in the first live action video.

\* \* \* \* \*